(12) United States Patent
Iwashiro (10) Patent No.: US 8,285,122 B2
(45) Date of Patent: Oct. 9, 2012

(54) DIGITAL BROADCAST RECEIVER

(75) Inventor: Hiroshi Iwashiro, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 725 days.

(21) Appl. No.: 12/374,194

(22) PCT Filed: May 14, 2007

(86) PCT No.: PCT/JP2007/059868
§ 371 (c)(1),
(2), (4) Date: Jan. 16, 2009

(87) PCT Pub. No.: WO2008/010343
PCT Pub. Date: Jan. 24, 2008

(65) Prior Publication Data
US 2009/0322959 A1    Dec. 31, 2009

(30) Foreign Application Priority Data
Jul. 20, 2006 (JP) .................................. 2006-198139

(51) Int. Cl.
*H04N 5/76* (2006.01)
(52) U.S. Cl. ........................................ 386/291; 386/297
(58) Field of Classification Search .................. 386/291, 386/296, 297, 326, 200, 230, 213, 214
See application file for complete search history.

(56) References Cited

U.S. PATENT DOCUMENTS

| | | | |
|---|---|---|---|
| 5,541,738 A * | 7/1996 | Mankovitz | 386/245 |
| 5,991,832 A | 11/1999 | Sato et al. | |
| 2006/0059520 A1 * | 3/2006 | Miyazawa | 725/52 |
| 2006/0078277 A1 | 4/2006 | Miyazaki | |
| 2006/0146146 A1 * | 7/2006 | Asada | 348/231.4 |

FOREIGN PATENT DOCUMENTS

| | | |
|---|---|---|
| EP | 1482728 A2 | 12/2004 |
| JP | 10-150611 A | 6/1998 |
| JP | 2000-59704 A | 2/2000 |
| JP | 2004-312179 A | 11/2004 |
| JP | 2005-80005 A | 3/2005 |
| JP | 2006-74614 A | 3/2006 |
| WO | WO 02/078317 A2 | 10/2002 |
| WO | WO 02-078317 A3 | 10/2002 |

OTHER PUBLICATIONS

2004 Nen 5 Gatsu 20 Nichi, pp. CEC-21-CEC-36, "CEC13 CEC Features Description", <URL:http://www.hdmi.org/download/HDMI_Specification_1.1.pdf>.

* cited by examiner

*Primary Examiner* — Robert Chevalier
(74) *Attorney, Agent, or Firm* — Birch, Stewart, Kolasch & Birch, LLP (57) ABSTRACT

After reservation information is acquired, whether there is any connection destination device is determined. When there is no connection destination device, a warning is displayed on a display device in the connection source device side. Reservation registration is stored in a memory in the connection source device side. This operation is repeated until a reservation start time point. When a reservation start state starts, it is confirmed again whether there is any connection device. When there is the connection device, a state of a power supply of a recording/reproducing device to be a reservation target is checked. When the power supply is off, the power supply of the recording/reproducing device to be the reservation target is requested to be turned on by communication, and the recording/reproducing device to be the reservation target is requested to select channel. Next, it is determined whether or not the channel selection is successful.

18 Claims, 5 Drawing Sheets

DIGITAL BROADCAST RECEIVER

BACKGROUND OF THE INVENTION

1. Field of the Invention

The present invention relates to a digital broadcast receiver and a digital device system related to the same.

2. Description of the Related Art

As the newest standard with general versatility for connecting a plurality of digital household electric appliances, for example, the HDMI standard has been defined. In the HDMI standard, CEC (Consumer Electronics Control) protocol is used. By using the CEC protocol, coordination of the devices connected by the HDMI cables is designed.

TABLE 1

| CEC COMMANDS | |
|---|---|
| COMMON CODE | VENDER UNIQUE CODE |
| Image View On | MENU SETTING TRANSFER |
| Active Source | PROGRAM INFORMATION |
| User Control Pressed | SPECIAL REMOTE CONTROL KEY |
| Record On | DETAILED ERROR NOTIFICATION |
| Record Off | |
| StandBy | |
| Set Stream Path | |
| STANDARD ERROR MESSAGE | |

Table 1 shows examples of CEC commands, and the CEC commands are broadly divided into a common code which is provided for keeping general versatility and is common without depending on each appliance or a vender, and a unique code unique to a vender for allowing the degree of freedom, which the vender can uniquely define.

For example, a digital broadcast receiver (TV) and a recording/reproducing device (recorder) are connected with the HDMI cable, and reservation of the recorder can be performed by the operation from the digital broadcast receiver side by using the CEC protocol (command).

SUMMARY OF THE INVENTION

Problems to be Solved by the Invention

However, in the products which have been announced up to now, the following problems arise when, for example, the digital broadcast receiver such as a liquid crystal television and a recording/reproducing device are connected with the HDMI cable.

1) In the operation of performing processing of transferring reservation information to the recording/reproducing device at the time of reservation registration, reservation information have had to be transferred to the recording/reproducing device every time reservation is registered, changed and deleted.

2) When connection of the recording/reproducing device cannot be checked from the digital broadcast receiver side, the procedure of i) registering reservation, ii) receiving notification that there is no connection of the recording/reproducing device, iii) connecting the recording/reproducing device, and iv) registering reservation again is necessary, and therefore, there is the problem of being troublesome because return to the former step occurs to the reservation registration procedure.

The present invention has an object to simplify the processing concerning reservation registration.

Means for Solving the Problems

In the present invention, when reservation information is held in the television side, change and cancellation of reservation can be easily performed (reservation information does not have to be transferred to a recorder at each time). Further, even in the state in which the recorder cannot accept reservation, reservation registration can be performed, and therefore, reservation can be made without any problem if only the recorder becomes idle by the time of start of the reservation. Further, a user can select whether the reservation information is held in the television side or in the recorder side.

Specifically, according to one aspect of the present invention, there is provided, in a digital device system which has a connection source device capable of viewing a digital broadcast, and a number n (n is a positive integer) of connection destination devices capable of recording a digital broadcast and capable of being connected to the connection source device, and is capable of two-way communication between the devices in accordance with a protocol defined in advance between both the devices, a digital device system characterized in that a first storage part for storing reservation registration data including viewing reservation information of the aforesaid connection source device and recording reservation information of each of the aforesaid connection destination devices is provided in the aforesaid connection source device side. Thereby, registration/change/deletion of reservation can be performed by operation in the connection source device side.

A second storage part storing the aforesaid reservation registration data is preferably provided in the aforesaid connection destination device side. The aforesaid reservation registration data preferably includes a reservation target device ID, a reservation target program ID, and a reservation target time period.

The aforesaid reservation registration data is preferably acquired by using the aforesaid two-way communication based on operation relating to reservation of the aforesaid connection source device and the aforesaid connection destination device. Until start of processing based on the aforesaid reservation, the aforesaid reservation registration data may be capable of being transferred or copied to the aforesaid connection destination device from the aforesaid connection source device by using the aforesaid two-way communication.

Based on the aforesaid reservation registration data stored in the aforesaid first storage part, collective management is performed in the aforesaid connection source device side, and an instruction for processing concerning the aforesaid reservation may be given to the aforesaid connection destination device by using the aforesaid two-way communication. The aforesaid reservation registration data is sent to the aforesaid second storage part by using the aforesaid two-way communication, and thereby the processing concerning reservation can be made manageable in the aforesaid connection destination device side.

By a certain time before a start time of the processing concerning the aforesaid reservation, the aforesaid reservation registration data is preferably sent to the aforesaid second storage part. Further, a management source of the aforesaid reservation registration data is preferably made settable, in the aforesaid connection source device side. Until start of processing based on reservation after acquisition of the aforesaid reservation information, processing of confirming presence or absence of connection of the connection destination device may be performed. In the processing of confirming the presence or absence of the aforesaid connection destination device, even when connection of the connection destination device cannot be found, reservation registration processing is preferably performed.

In the processing of confirming the presence or absence of the aforesaid connection destination device, when the connection destination device cannot be found, notification that the connection destination device cannot be found may be made in the aforesaid connection source device.

According to another aspect of the present invention, there is provided, in a digital device system which has a television device capable of viewing a digital broadcast, and a number n (n is a positive integer) of recording/reproducing devices capable of recording a digital broadcast and capable of being connected to the television device, and is capable of two-way communication between the devices in accordance with a CEC protocol defined in advance between both the devices, a digital device system characterized in that a first storage part for storing reservation registration data including viewing reservation information of the aforesaid television device and recording reservation information of each of the aforesaid recording/reproducing devices is provided in the aforesaid television device side.

Until start of processing based on reservation after acquisition of the aforesaid reservation information, processing of confirming presence or absence of connection of the recording/reproducing device is preferably performed. Further, in the processing of confirming the presence or absence of connection of the aforesaid recording/reproducing device, even when the recording/reproducing device cannot be found, reservation registration processing can be performed.

According to another aspect of the present invention, there is provided, in a television device which is capable of viewing a digital broadcast, capable of recording a number n (n is a positive integer) of digital broadcasts capable of being connected to the television device, and is capable of two-way communication between the devices in accordance with a CEC protocol defined in advance between both the devices, a television device characterized in that a first storage part for storing reservation registration data including viewing reservation information of the aforesaid television device and recording reservation information of each of the aforesaid recording/reproducing devices is provided in the aforesaid television device side.

Further, there is provided, in a recording/reproducing device which is one of a number n (n is a positive integer) of recording/reproducing devices capable of recording a digital broadcast capable of being connected to a television device capable of viewing a digital broadcast, and forms a digital device system capable of two-way communication between the devices in accordance with a CEC protocol defined in advance between both the devices, a recording/reproducing device characterized in that a second storage part for storing reservation registration data including viewing reservation information of the aforesaid television device and recording reservation information of each of the aforesaid recording/reproducing devices is provided in the aforesaid recording/reproducing device side.

Further, there is provided a system communicating information inside devices with a protocol defined between both the devices in advance by performing two-way communication by using common codes based on the HDMI standard by connecting a television device and a recording/reproducing device via an HDMI interface, characterized in that a reservation management table which is collectively managed by the aforesaid television device side by acquiring program reservation information in the aforesaid television device and the aforesaid recording/reproducing device by the two-way communication based on the aforesaid common codes is held.

Advantages of the Invention

According to the present invention, in the system including the recorder capable of recording a digital broadcast stream in a recording medium, and the digital broadcast receiving television capable of being connected to the recorder with a communication protocol, there is provided the advantage of being capable of easily performing reservation registration and cancellation in the recorder side from the television side. Further, reservation for an external recorder can be made in the sense of performing reservation of the television (viewing reservation, i.LINK reservation).

Further, reservation management with the television as the subject and with the recorder as the subject can be selected in accordance with the intention and preference of a user. When reservation management is performed on the television side, reservation registration can be performed irrespective of the presence or absence and state of the external device (attention is called by a warning), and therefore, there is provided the advantage of eliminating return to the former step of the reservation registration operation.

DESCRIPTION OF SYMBOLS

A . . . digital broadcast receiver, B . . . DVD recorder, 1 . . . antenna, 3 . . . digital broadcast receiving part, 5 . . . HDMI interface part, 7 . . . HDMI signal processing part, 11 . . . decoder, 15 . . . remote control photoreceptor, 17 . . . control part (CPU), 18 . . . storage part, 21 . . . speaker, 23 . . . display, 25 . . . audio signal processing part, 27 . . . video signal processing part, 41 . . . antenna, 43 . . . digital tuner, 45 . . . HDMI signal processing part, 47 . . . control part, 51 . . . remote control photoreceptor, 53 . . . storage part (HDD), 55 . . . HDMI interface part, 57 . . . electronic program guide acquiring part, 63 . . . optical disk drive part, 67 . . . operation part.

DETAILED DESCRIPTION OF THE INVENTION

Figure 1:
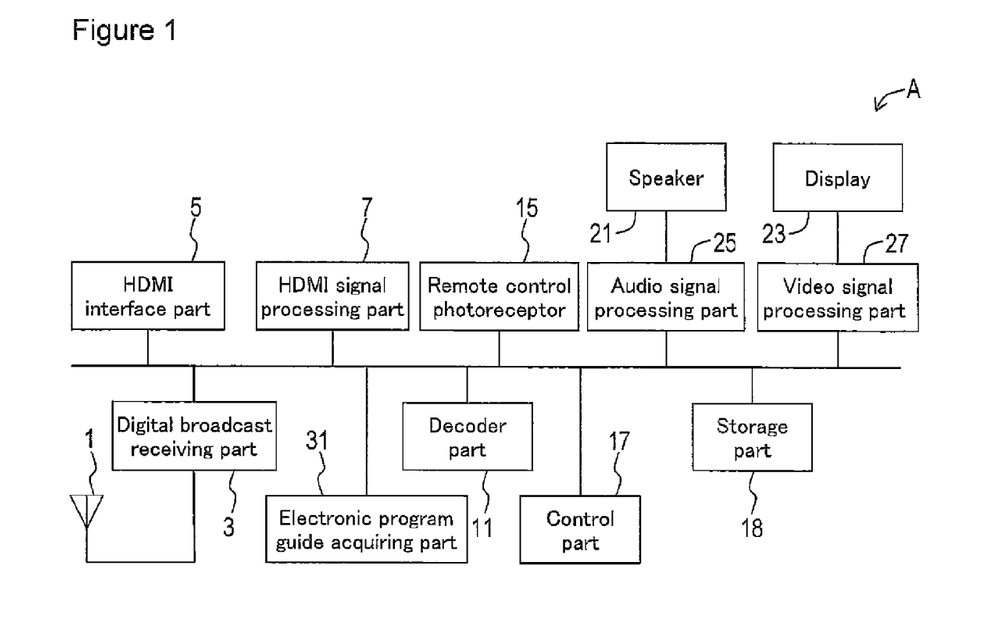
FIG. 1 is a functional block diagram showing one configuration example of a liquid crystal television device capable of receiving a digital broadcast which is one example of a connection source electronic device of a system shown in the following FIG. 3.
Figure 2:
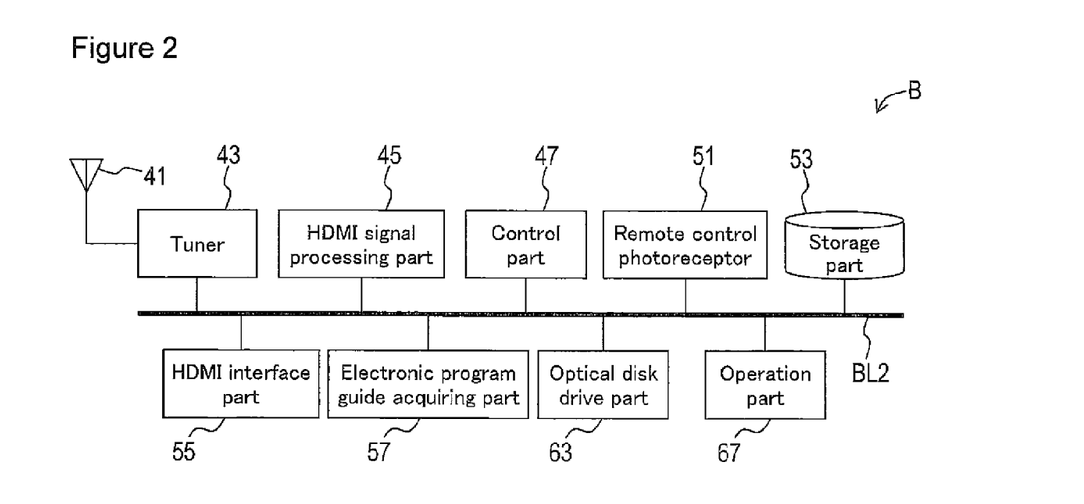
FIG. 2 is a functional block diagram showing one configuration example of a DVD recorder (recording/reproducing device) which is one example of a connection destination electronic device of the system shown in FIG. 3.
Figure 3:
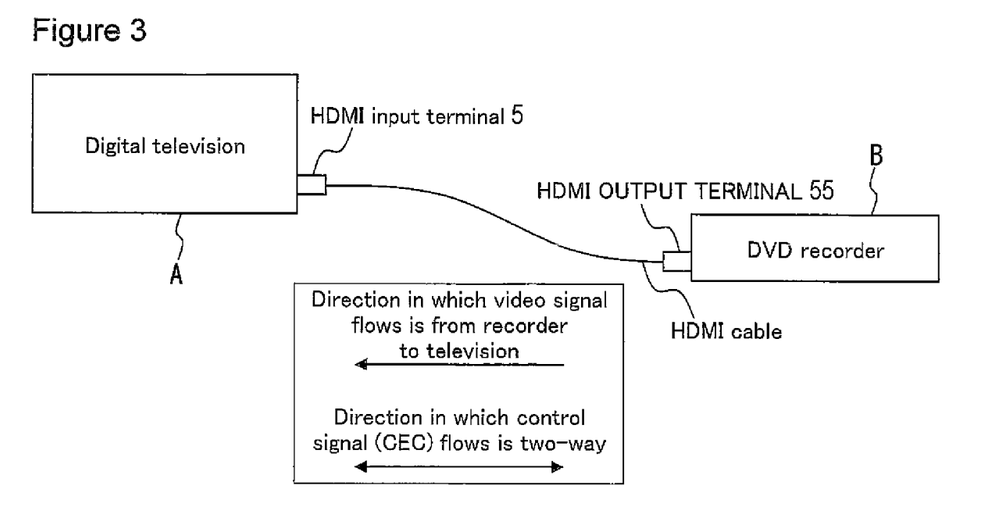
FIG. 3 is a diagram showing one configuration example of an electronic device system according to the present embodiment.

Hereinafter, an electronic device system according to an embodiment of the present invention will be described with reference to the drawings with an example of a system based on the HDMI standard. FIG. 3 is a diagram showing one configuration example of an electronic device system according to the present embodiment. FIG. 1 is a functional block diagram showing one configuration example of a liquid crystal television device (hereinafter, called digital broadcast receiver) capable of receiving a digital broadcast which is an example of a connection source electronic device of the system shown in FIG. 3. FIG. 2 is a functional block diagram showing one configuration example of a DVD recorder (recording/reproducing device) which is one example of a connection destination electronic device of the system shown in FIG. 3.

The above described Table 1 shows examples of the CEC command (code). As shown in Table 1, the CEC commands include common codes in the HDMI standard and unique codes which are unique to a vender. Here, the vender unique codes include the codes relating to transfer of menu setting, program information, a special remote control key, detailed error notification and the like. The processing which will be described hereinafter is on the basis of the processing based on the CEC commands.

As shown in FIG. 1, a digital broadcast receiver A has an antenna 1, a digital broadcast receiving part 3 including a tuner of a digital broadcast, an HDMI interface part 5, an HDMI signal processing part 7, a decoder 11, a remote control photoreceptor 15, an audio signal processing part 25 which performs processing of an audio signal, a speaker 21 which outputs sound based on the audio signal after processing, a video signal processing part 27 which performs processing of a video signal, a display 23 which outputs video based on the video signal after processing, a control part (CPU) 17 which controls each of these function blocks through a bus line, and a storage part 18 which stores a program and the other information for performing the following processing.

As shown in FIG. 2, a DVD recorder B has an antenna 41, a digital tuner 43, an HDMI signal processing part 45, a control part 47, a remote control photoreceptor 51, a storage part (HDD) 53, an HDMI interface part 55, an electronic program guide acquiring part 57, an optical disk drive part 63 such as a DVD, and an operation part 67.

FIG. 3 is a diagram showing a state in which the HDMI input terminal 5 of the digital broadcast receiver A and the HDMI output terminal 55 of the DVD recorder B shown in FIG. 1 and FIG. 2 are connected by the HDMI cable. A video signal flows to the digital broadcast receiver A from the DVD recorder B as shown by the arrow, between the digital broadcast receiver A and the DVD recorder B, and a control signal (CEC code) flows in both directions between the digital broadcast receiver A and the DVD recorder B. Control processing between the devices can be performed based on exchange of the control signals of the CEC codes through the HDMI cable between the devices.

Figure 4:
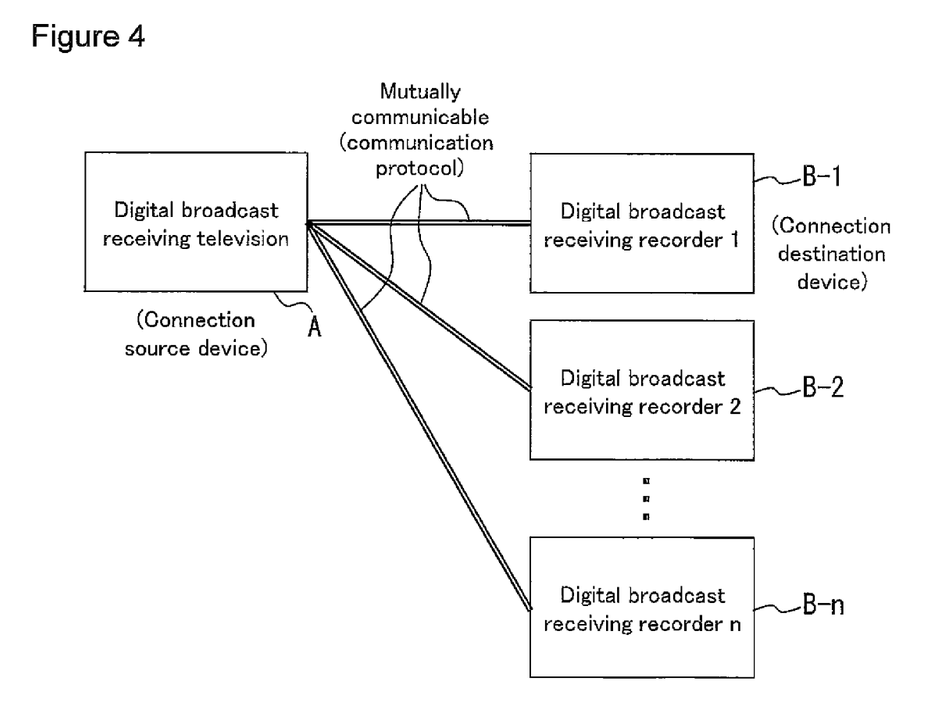
FIG. 4 is a diagram of a more concrete mode of a digital device system according to a first embodiment of the present invention, which relates to the diagram shown in FIG. 3 and is made closer to an actual system.

Next, the more concrete mode of the digital device system according to a first embodiment of the present invention will be described. FIG. 4 is a diagram showing one configuration example of the digital device system according to the present embodiment, which relates to the diagram shown in FIG. 3, and is a diagram made closer to an actual system. As shown in FIG. 4, the digital broadcast receiver (TV: connection source device) A, and a number n (n is a positive integer) of digital broadcast receiving recorders (recording/reproducing devices: connection destination devices) B-1 to B-n are connected with the HDMI cables. As described above, the digital broadcast receiver A and the digital broadcast receiving recorders B-1 to B-n are capable of two-way communication by the CEC protocol.

TABLE 2

| | RESERVATION START TIME | RESERVATION FINISH TIME | CHANNEL | RESERVATION OBJECT |
|---|---|---|---|---|
| 1 | 6/10 15:00 | 6/10 16:00 | BS 103 | i.LINK (RECORDING) |
| 2 | 6/12 08:00 | 6/12 08:30 | CS 100 | TELEVISION (VIEWING) |
| 3 | 6/15 21:00 | 6/15 22:00 | TERRESTRIAL D011 | RECORDER (RECORDING) |
| . | . | . | . | . |
| . | . | . | . | . |
| m | — | — | — | — |

Table 2 shows one example of a reservation registration information table stored in the storage part 18 (FIG. 1) on the digital broadcast receiver A side. The information shown in Table 2 is stored in the storage part 18. However, the information can be copied or moved to the storage part 53 in the recording/reproducing device side by two-way communication. As shown in Table 2, the reservation registration information table includes recording or viewing start time based on reservation, recording or viewing finish time based on the reservation, the channel of a target program, and the reservation target device. For example, it is shown that in ID3, the reservation for recording the program to be broadcast at 011 channel of the terrestrial digital broadcast for the time from 21:00 to 22:00 on June 15 to the recording/reproducing device is made. According to the information, recording or viewing with respect to various programs is reserved, and what reservation is made can be confirmed.

Figure 5:
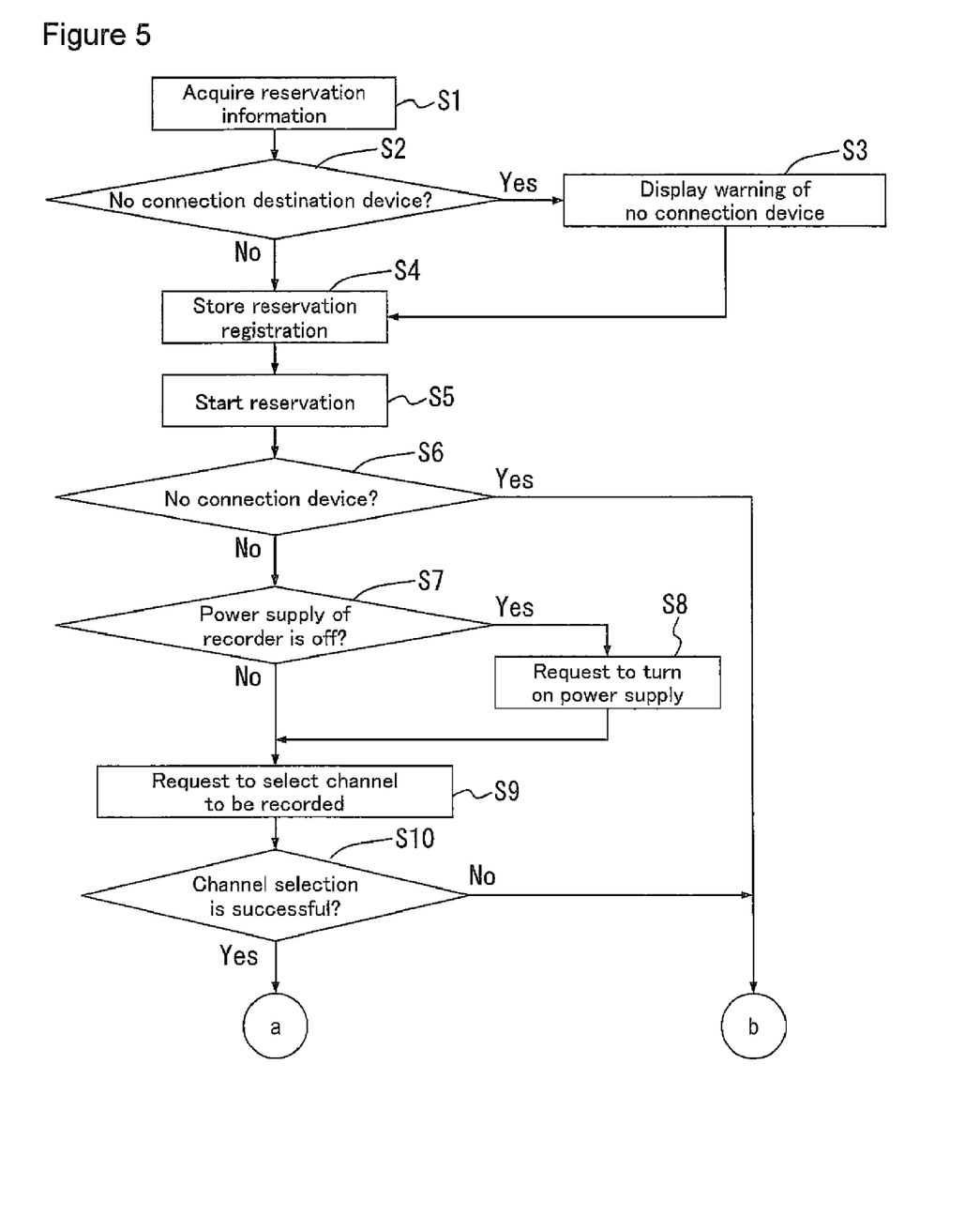
FIG. 5 is a flowchart showing a flow of reservation processing for a recording/reproducing device in a digital broadcast receiver A side.
Figure 6:
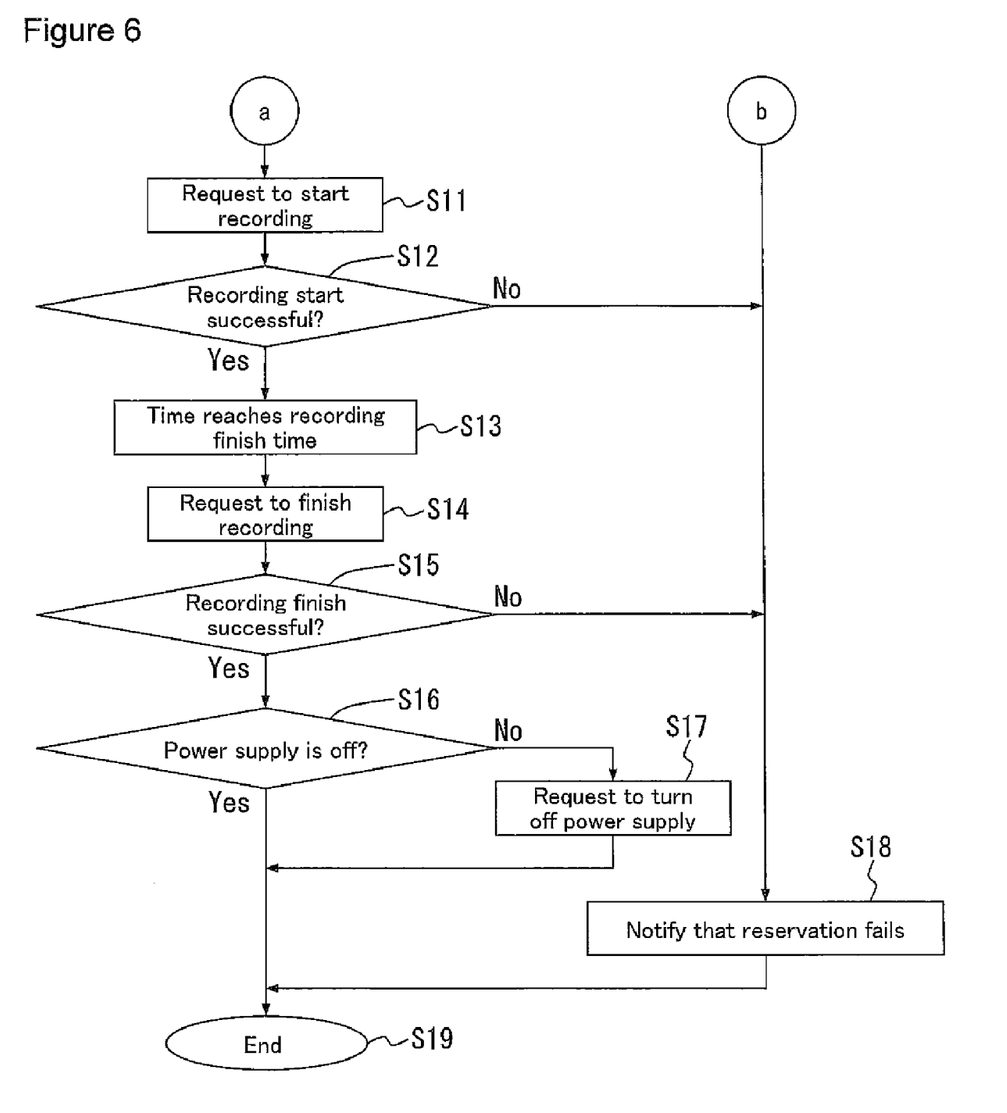
FIG. 6 is a flowchart showing a flow of reservation processing for the recording/reproducing device in the digital broadcast receiver A side, which is continued from FIG. 5.

FIGS. 5 and 6 are flowcharts showing a flow of reservation processing for the recording/reproducing device in the digital broadcast receiver A side. First, in step S1, the reservation information as shown in Table 2 is acquired, and in step S2, with respect to the connection source device A, it is determined whether or not there is any connection destination device of the HDMI or the like, for example. When there is no connection destination device (Yes), the warning such as "There is no connection device" or "Connect the device" indicating that there is no connection device, for example, is displayed on the display device on the digital broadcast receiver A side, but the flow goes to step S4 as in the case in which there is the connection destination device in step S2 (No of step 2), and the processing of storing the reservation registration in the memory 18 in the digital broadcast receiver A side is performed. Thereby, until the reservation time approaches (reservation start time point: until step S4), the above described operation is repeated since there is the possibility that a device will be newly connected. When the reservation starting state starts in step S5, it is confirmed again whether or not there is any connection device in step S6, and when there is a connection device (No), the flow goes to step S7, and on/off of the power supply of the recording/reproducing device to be the reservation target is checked. When the power supply is off in step S7, the connection source device gives a request to turn on the power supply of the recording/reproducing device to be the reservation target by communication in step S8, and the flow goes to step S9 as in the case in which the power supply is on from the beginning (step S7:

No), and instruction is given to the recording/reproducing device being the reservation target to select a channel to be the reservation recording target, for example, by communication. Next, in step S9, it is determined whether or not channel selection is successful (step S10). For example, it is determined whether or not the contract is made, whether or not the B-CAS card is inserted, or the like.

In the case of Yes in step S10, the flow goes to step S11, and the recording/reproducing device is requested to start recording. Next, in step S12, it is determined whether or not the recording start processing is successful, and when the recording start processing fails (No), the flow goes to step S18. When the recording start processing is successful (Yes), the flow goes to step S13, and when time reaches the recording finish time, the recording/reproducing device is requested to perform recording finish processing in step S14. Next, in step S15, it is determined whether or not the recording finish processing is successful, and when it is not successful (No), the flow goes to step S18. When it is successful (Yes), the flow goes to step S16. When the power supply of the recording/reproducing device is not off in step S16 (No), the flow goes to step S17, where the recording/reproducing device is requested to turn off the power supply, and as in the case in which the power supply is off (Yes), the processing is finished (step S19). When channel selection fails in step S10, the flow goes to step S18 as in the case of Yes in step S6, and notification that the processing based on the reservation fails is made. It is made a rule to return the power supply to the original state in step S17, but when the processing about reservation continues timewise, the processing of especially turning off the power supply is not necessary, and therefore, the control is preferably conducted not to turn off the power supply.

Thus, when the reservation information is stored in the memory 18 of the digital broadcast receiver A side, by managing the reservation information on the television side, reservation for the recording/reproducing device which is the connection destination device can be made by the operation on the television side which is the connection source device without transferring the reservation information to the storing/reproducing device each time reservation such as viewing reservation and iLink reservation for the storing/reproducing device is made. Even when the storing/reproducing device cannot accept reservation, reservation registration can be made in the digital broadcast receiver side. Therefore, if the storing/reproducing device is brought into an idle state by the reservation start time, reservation can be made, and power saving effect also can be provided.

If, for example, the reservation information of the target device is transferred to the storing/reproducing device side from the digital broadcast receiver A side, and the reservation information is stored in the storage part 53 (FIG. 2) during the time from the reservation registration storage (step S4) to the reservation start (step S5), the storing/reproducing device can be made the subject of the reservation management. A user may be allowed to select which side holds the reservation information. Selection of the user can be made by a remote control device, GUI or the like.

Figure 7:
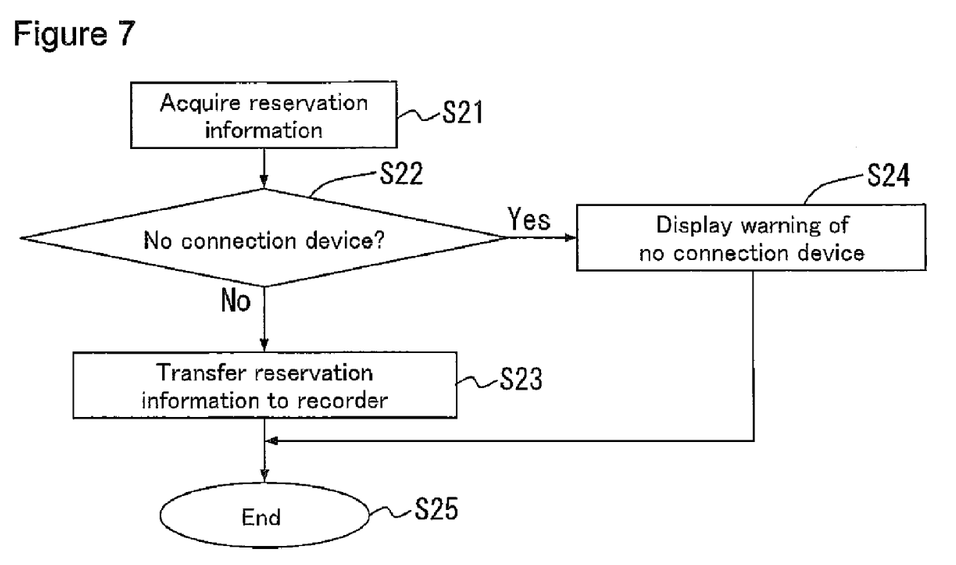
FIG. 7 is a flowchart showing a flow of reservation-related processing in a digital device system according to a second embodiment of the present invention.

Next, a digital device system according to a second embodiment of the present invention will be described. The system configuration is similar to that shown in FIG. 4. FIG. 7 is a flowchart showing a flow of reservation-related processing according to the present embodiment. In the present embodiment, reservation information is managed in the storing/reproducing device side. At the time of reservation registration, the reservation information is sent to the storage/reproducing device side, and thereafter, management is performed in the storage/reproducing device side. First, in step S21, the digital broadcast receiver acquires the reservation information, and creates the reservation management information data as shown in Table 2. Thereafter, presence or absence of a connection device is determined (step S22), and when there is no connection device (Yes), the flow goes to step S24, where warning that there is no connection device is issued. Next, in step S25, the processing is finished. When there is a connection device (No), the flow goes to step 823, and the information relating to the recording/reproducing device to be the target out of the reservation information is sent to the recording/reproducing device. Next, in step S25, the processing is finished. Thereby, its own reservation information relating to the recording/reproducing device can be held in the recording/reproducing device side. Therefore, the processing can be performed in the recording/reproducing device side, and the advantage of allowing the digital broadcast receiver to be free is provided.

In the above described processing, a control can be conducted so as to hold the reservation information in the digital broadcast receiver side until, for example, ten minutes before the start of reservation (time is optional in a certain limitation) and transfer the reservation information to the storing/reproducing device to be the target thereafter. This provides the advantage of opening the memory region of the storage part 18 of the digital broadcast receiver, and being capable of using it as a storage region for new information. It is also possible for a user to set how long time before the start of reservation transfer or the like of the reservation information is performed. Further, the time point of operation of the user can be made the timing of transfer. It is naturally possible to hold the reservation information in both the devices.

Industrial Applicability

The present invention is applicable to a digital device system.

The invention claimed is:
1. A digital device system, comprising:
a communication part; and
a connection source device capable of viewing a digital broadcast, and a number n (n is a positive integer) of connection destination devices capable of recording a digital broadcast and capable of being connected to the connection source device, and is capable of two-way communication using the communication part between the devices in accordance with a protocol defined in advance between both the devices, wherein
said connection source device has a first storage part for storing reservation registration data including viewing reservation information of said connection source device and recording reservation information of each of said connection destination devices,
said reservation registration data includes a reservation target device ID, a reservation target program ID, and a reservation target time period,
the reservation registration data is maintained in said first storage part at least until a predetermined time with respect to a start of an execution of a reservation associated with a connection destination apparatus,
the connection source device includes a control part that confirms presence or absence of connection of the connection destination device to the connection source device, and outputs a notification when the connection destination device is not connected to the connection source device while allowing the reservation registration data to be stored in the first storage part, wherein until the start of the execution of the reservation, the connection source device allows collective management of the stored reservation registration data, and an instruction concerning said reservation registration data is given from said connection source device to said connection destination device by using said two-way communication.

2. The digital device system according to claim 1, wherein a second storage part storing said reservation registration data is provided in said connection destination device side.

3. The digital device system according to claim 1, wherein until start of processing based on said reservation, said reservation registration data can be transferred or copied to said connection destination device from said connection source device by using said two-way communication.

4. The digital device system according to claim 2, wherein said reservation registration data is sent to said second storage part by using said two-way communication, and thereby, the processing concerning reservation is made manageable in said connection destination device side.

5. The digital device system according to claim 4, wherein by a certain time before a start time of the processing concerning said reservation, said reservation registration data is sent to said second storage part.

6. The digital device system according to claim 1, wherein a management source of said reservation registration data is made settable in said connection source device side.

7. The digital device system according to claim 1, wherein until start of processing based on reservation after acquisition of said reservation information, processing of confirming presence or absence of connection of the connection destination device is performed.

8. The digital device system according to claim 7, wherein the notification includes making a notification that the connection destination device cannot be found in said connection source device.

9. A digital device system, comprising:
a communication part; and
a television device capable of viewing a digital broadcast, and a number n (n is a positive integer) of recording/reproducing devices capable of recording a digital broadcast and capable of being connected to the television device, and is capable of two-way communication using the communication part between the devices in accordance with a CEC protocol defined in advance between both the devices, wherein
said television device has a first storage part for storing reservation registration data including viewing reservation information of said television device and recording reservation information of each of said recording/reproducing devices,
said reservation registration data includes a reservation target device ID, a reservation target program ID, and a reservation target time period,
the reservation registration data is maintained in said first storage part at least until a predetermined time with respect to a start of an execution of a reservation associated with a recording/reproducing device,
the television device includes a control part that confirms presence or absence of connection of the recording/reproducing device to the television device, and outputs a notification when the recording/reproducing device is not connected to the television device while allowing the reservation registration data to be stored in the first storage part, wherein
until the start of the execution of the reservation, the television device allows collective management of the stored reservation registration data, and
an instruction concerning said reservation registration data is given from said television device to said recording/reproducing device by using said two-way communication.

10. The digital device system according to claim 9, wherein until start of processing based on reservation after acquisition of said reservation information, processing of confirming presence or absence of connection of the recording/reproducing device is performed.

11. The digital device system according to claim 1, wherein in the processing of confirming presence or absence of connection of said recording/reproducing device, even when the recording/reproducing device cannot be found, reservation registration processing is performed.

12. A television device capable of viewing a digital broadcast, capable of recording a number n (n is a positive integer) of recording/reproducing devices capable of recording digital broadcasts and capable of being connected to the television device, and is capable of two-way communication between devices in accordance with a CEC protocol defined in advance between both the devices, the television device comprising:
a communication part for communicating with a communication part of the recording/reproducing devices; and
a first storage part for storing reservation registration data including viewing reservation information of said television device and recording reservation information of each of said recording/reproducing devices is provided in said television device side; wherein,
said reservation registration data includes a reservation target device ID, a reservation target program ID, and a reservation target time period,
the reservation registration data is maintained in said first storage part at least until a predetermined time with respect to a start of an execution of a reservation associated with a c recording/reproducing device,
the television device includes a control part that confirms presence or absence of connection of a recording/reproducing device to the television device, and outputs a notification when the recording/reproducing device is not connected to the television device while allowing the reservation registration data to be stored in the first storage part, wherein
until the start of the execution of the reservation, the television device allows collective management of the stored reservation registration data, and
an instruction concerning said reservation registration data is given from said television device to said recording/reproducing device by using said two-way communication.

13. A system communicating information inside devices with a protocol defined between both the devices in advance by performing two-way communication by using common codes based on the HDMI standard by connecting a television device and a recording/reproducing device via an HDMI interface, the system comprising:
a communication part, wherein
the television device includes a reservation management table which is collectively managed by said television device side by acquiring program reservation information in said television device and said recording/reproducing device by the two-way communication based on said common codes is held, and the program reservation information is maintained in the television device at least until a predetermined time with respect to a start of an execution of a reservation associated with a recording/reproducing device.

14. The digital device system according to claim 2, wherein said reservation registration data is acquired by using said two-way communication based on operation relating to reservation of said connection source device and said connection destination device.

15. The digital device system according to claim 1, wherein the predetermined time is a start time of the execution of the reservation.

16. The digital device system according to claim 9, wherein the predetermined time is a start time of the execution of the reservation.

17. The television device according to claim 12, wherein the predetermined time is a start time of the execution of the reservation.

18. The system according to claim 13, wherein the predetermined time is a start time of the execution of the reservation.

* * * * *